United States Patent
Buschi et al.

(10) Patent No.: US 7,375,840 B2
(45) Date of Patent: May 20, 2008

(54) METHOD AND SYSTEM FOR THE MANAGEMENT OF FILES AND MAIL ATTACHMENTS

(75) Inventors: Giovanni Buschi, Nice (FR); Apollonie Sbragia, Antibes (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/536,714

(22) Filed: Sep. 29, 2006

(65) Prior Publication Data

US 2007/0078902 A1  Apr. 5, 2007

(30) Foreign Application Priority Data

Sep. 30, 2005  (EP)  .................................. 05300787

(51) Int. Cl.
*G06F 15/00*  (2006.01)
(52) U.S. Cl. ..................... 358/1.15; 358/402; 707/200; 709/206
(58) Field of Classification Search ............... 358/1.15, 358/402; 707/10, 102, 200; 709/202, 203, 709/206, 217, 219; 715/530
See application file for complete search history.

(56) References Cited

U.S. PATENT DOCUMENTS

| | | | | |
|---|---|---|---|---|
| 5,760,773 A | * | 6/1998 | Berman et al. | 715/808 |
| 6,505,236 B1 | * | 1/2003 | Pollack | 709/206 |
| 6,654,746 B1 | * | 11/2003 | Wong et al. | 709/203 |
| 2004/0158607 A1 | * | 8/2004 | Coppinger et al. | 709/206 |
| 2005/0052692 A1 | * | 3/2005 | Buschi et al. | 358/1.15 |
| 2006/0026236 A1 | * | 2/2006 | Scian et al. | 709/206 |
| 2006/0031309 A1 | * | 2/2006 | Luoffo et al. | 709/206 |
| 2007/0022166 A1 | * | 1/2007 | Bhogal et al. | 709/206 |

* cited by examiner

*Primary Examiner*—Kimberly A. Williams
(74) *Attorney, Agent, or Firm*—Norman L. Gundel; Hoffman, Warnick & D'Alessandro LLC

(57) ABSTRACT

The present invention is directed to a method and system for the management of files and mail attachments. A method for managing files that have been received by a user as an attachment to an e-mail in accordance with an embodiment of the invention includes: detaching a file from an e-mail and storing the detached file; creating a system file link with the detached file that includes details relating to a storage location and an identity of the e-mail from which the file was detached; and re-establishing a link between the detached file and the e-mail in response to a request of the user to locate the e-mail.

6 Claims, 2 Drawing Sheets

METHOD AND SYSTEM FOR THE MANAGEMENT OF FILES AND MAIL ATTACHMENTS

FIELD OF THE INVENTION

This invention relates to the management of files and mail attachments particularly in a computer related environment.

BACKGROUND OF THE INVENTION

Computers, workstations or other related computer devices have a large amount of storage capacity. In the current environment the storage capacity is often utilised to store attachments from e-mail or the like. The attachments are generally stored in a section of memory under a suitable file name associated with, for example, a document, spreadsheet, presentation, etc.

In general, a user receives an e-mail with attached files. The file is often detached and stored as mentioned above and later the files are removed from the e-mail to minimise mailbox storage space. The result is that there is now no linkage between the file and the e-mail. The user is not able to determine who sent the file and when and any other details in the e-mail which may be relevant.

Occasionally, with time and effort in searching or a bit of luck, the user can re-establish the linkage between a file and the e-mail it was sent in or attached to. However this is not always the case.

US 2005-0052692 A1 discloses a system where a file is detached from an e-mail and can then be found by clicking an icon in the e-mail. When the file is detached an entry is created in a document reference file. This file is then accessed when the icon in the e-mail is clicked. This provides a mechanism for ensuring that file that was detached from an e-mail can be rediscovered.

It is not quite so straight forward to find the e-mail from which a file has been detached therefrom. E-mails are more transient and are often moved from one folder to another. The present invention addresses the problem of finding an e-mail from which a file has been detached.

SUMMARY OF THE INVENTION

The present invention is directed to a method and system for the management of files and mail attachments A first aspect of the invention is directed to a method for managing files that have been received by a user as an attachment to an e-mail, the method comprising: detaching a file from an e-mail and storing the detached file; creating a system file link with the detached file that includes details relating to a storage location and an identity of the e-mail from which the file was detached; and re-establishing a link between the detached file and the e-mail in response to a request of the user to locate the e-mail.

A second aspect of the invention is directed to a system for managing files that have been received by a user as an attachment to an e-mail, comprising: a system for detaching a file from an e-mail; a system for storing the detached file; a system for creating a system file link with the detached file that includes details relating to a storage location and an identity of the e-mail from which the file was detached; and a system for re-establishing a link between the detached file and the e-mail in response to a request of the user to locate the e-mail.

BRIEF DESCRIPTION OF THE DRAWINGS

These and other features of the present invention will be more readily understood from the following detailed description of the various aspects of the invention taken in conjunction with the accompanying drawings.

DETAILED DESCRIPTION OF THE INVENTION

Figure 1:
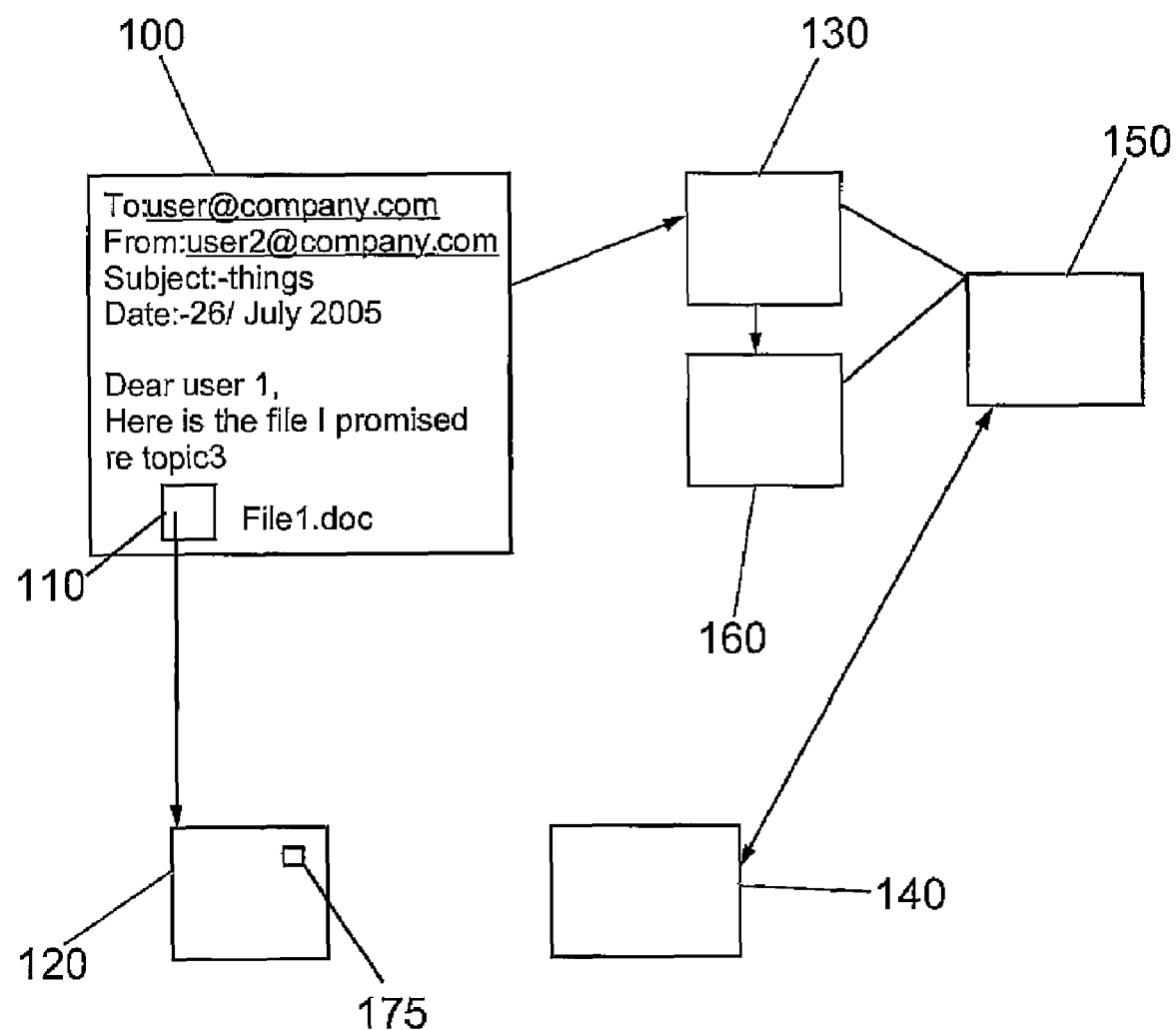
FIG. 1 is an illustrative schematic drawing of a mail tool and an operating system in accordance with an embodiment of the present invention.

Referring initially to FIG. 1, an e-mail 100 is received. The e-mail 100 is sent to a user 1 from a user 2. The e-mail 100 includes a subject, date, a message and an attached file 110.

In the normal course of work or practice, the e-mail 100 and attached file 110 may become separated. This is often the case when a user has a limited amount of storage space. In this situation, the attached file 110 is detached 120 and stored in a known memory location. At the time the attached file 110 is detached 120, the e-mail 100 is stored in a known memory location 130. The known memory location 130 of the e-mail 100 is stored in a detached documents link reference 140 associated with the detached file 120.

The detached file 120 includes an icon 175 which can be selected to enable re-establishment of the link to the e-mail 100. This permits the user to find the e-mail 100 which carried the detached file 120 by just clicking on the icon 175 and thereby opening the e-mail 100 from the known memory location 130.

A daemon 150 acts to poll the detached documents link reference 140 and compares this with the known memory location 130 of the e-mail 100 continually. Thus, if the icon 175 is clicked the daemon 150 reads the detached document link reference 140 and opens the e-mail 100 stored in the known memory location 130. The detached document link reference 140 can have various fields, which are recognised by the daemon 150 and used to establish the above mentioned linkage. The fields can include, for example:

Key (e.g. 19xy);
Document name (e.g. presEBOD.ppt);
Document full path (e.g. C:\EBOD);
Deleted flags (e.g. Y, N);
Mail database (e.g. C:\user1\mail); and
Mail ID (e.g. CB1234567).

It is common for the memory location 130 of an e-mail 100 to change due to re-organising or re-prioritorisation of the mail box. In FIG. 1, for example, the new location of the e-mail is shown as 160. The daemon 150 detects that the e-mail 100 has moved and the detached documents link reference 140 is updated. A new mail database reference ID and mail reference if necessary are stored which correspond with new location 160 of the e-mail 100.

If the user clicks on the icon 175 (as previously described) of the detached file 120 the daemon 150 will now seek the e-mail 100 in the new location 160.

The location 130 of the e-mail 100 and the location 120 of the detached file 120 can be changed at anytime by the user. When this happens the detached documents link reference 140 will be updated by the daemon 150.

Figure 2:
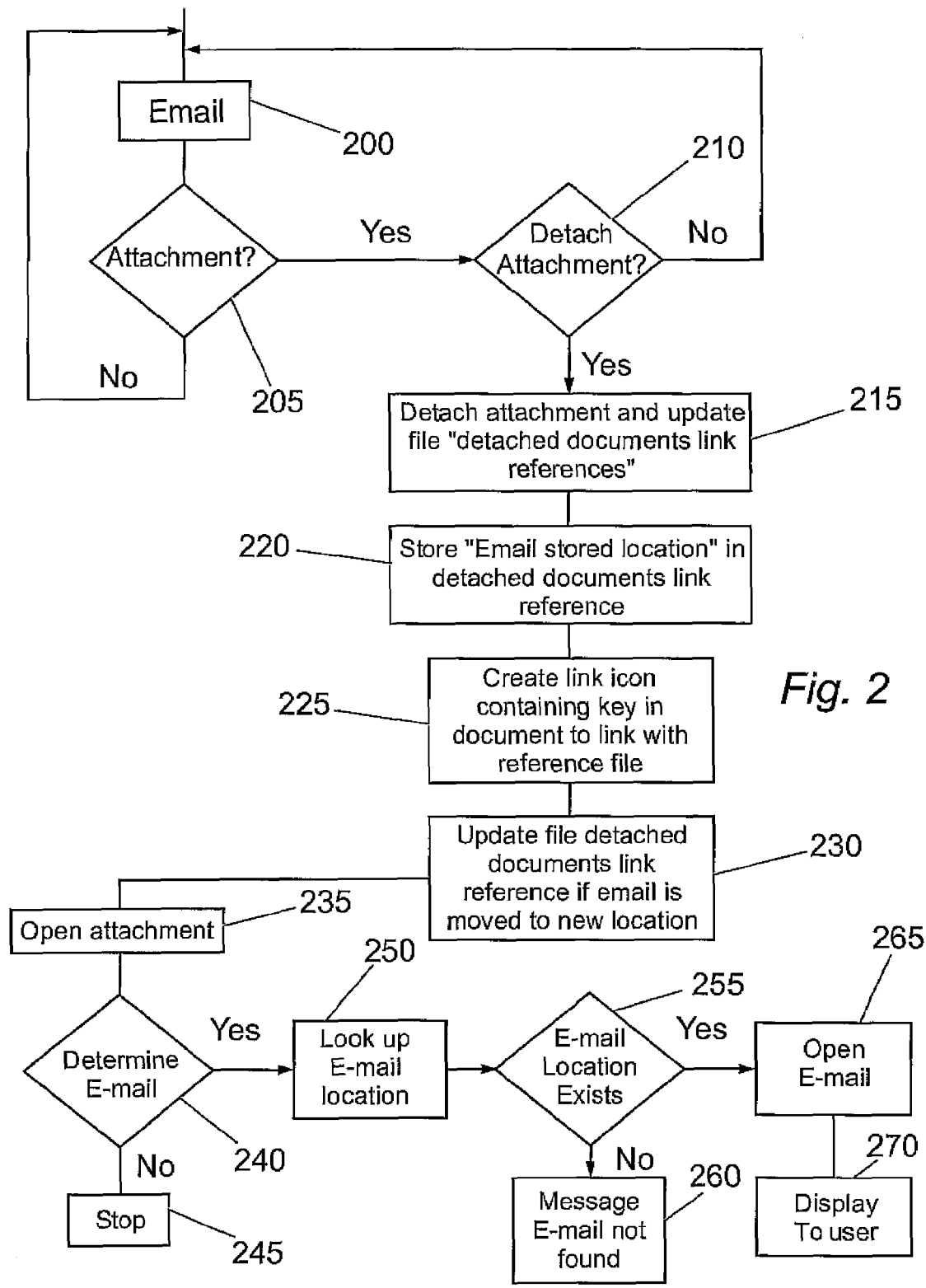
FIG. 2 is a flow chart of an illustrative method in accordance with an embodiment of the present invention.

Referring now to FIG. 2, a flowchart of the process steps of the current invention are set out.

An e-mail is received at step 200. Step 205 determines if there is an attachment. If "no", the system awaits the next incoming e-mail. If "yes", step 210 determines if the attachment is to be detached. If "yes", the attachment is detached and stored and the detached documents link reference file is updated in step 215. The step of detaching the attachment may occur after the e-mail has been opened many times or may be opened at the first time of opening. Regardless of when the detachment step occurs, the mail may be marked to indicate that an attachment has been removed. The current e-mail stored location (e.g. in the form of mailbox database ID and mail reference ID) is stored at step 220. It will be appreciated that different fields may be used instead. An icon is created at step 225 in the attachment that has been detached which includes a key to the detached document link reference. The icon can be clicked by the user to facilitate the link from the file to the e-mail if the e-mail has not been deleted. If the e-mail is moved, then the detached documents link reference is updated at step 230.

A user opens the file attachment at step 235 and determines that the attachment has an icon indicating that the file was once part of an e-mail. The user makes a determination at step 240 as to whether or not the user needs to know anything about the e-mail. If "no", the process stops at step 245. If "yes", the daemon is quizzed to identify the e-mail location at step 250. A determination is then make at step 255 to see if the identified e-mail and e-mail location can be found. If "no", the user receives an "e-mail not found" message at step 260. If "yes", the e-mail is opened at step 265 and displayed to the user at step 270. In this way, from the e-mail, the user can thus determine who sent the attachment, when, and for what purpose.

If the e-mail is moved from one storage location to another the e-mail is still located in the same manner, but the location stored in respect of the attachment will be different.

While the invention has been particularly shown and described with reference to a preferred embodiment, it will be understood that various changes in form or detail may be made therein without departing from the spirit and scope of the invention.

The invention claimed is:

1. A method of managing files that have been received by a user as an attachment to an e-mail, the method comprising:
   detaching a file from an e-mail and storing the file;
   creating a system file link with the detached file that includes details relating to a storage location and an identity of the e-mail from which the file was detached;
   re-establishing a link between the detached file and the e-mail in response to a request of the user to locate the e-mail;
   monitoring a change in the location of the e-mail; and
   updating the system file link with a new location of the e-mail in response to a change in the location of the e-mail.

2. The method of claim 1, further comprising:
   opening and displaying the e-mail to the user.

3. The method of claim 1, further comprising:
   continually monitoring the location of the e-mail to enable the re-establishment of the link.

4. The method of claim 1, further comprising:
   including additional information in the system file relating to at least a file location and name of the detached file.

5. The method of claim 1, further comprising:
   including an icon with the detached file; and
   selecting the icon to re-establish the link between the detached file and the e-mail.

6. The method of claim 5, further comprising:
   displaying the e-mail in response to the selection of the icon.

* * * * *